United States Patent [19]

Benedict

[11] Patent Number: 4,735,719

[45] Date of Patent: Apr. 5, 1988

[54] COFFEE FILTER RING

[75] Inventor: Charles E. Benedict, Tallahassee, Fla.

[73] Assignee: Benedict Engineering Co., Inc., Tallahassee, Fla.

[21] Appl. No.: 14,032

[22] Filed: Feb. 12, 1987

[51] Int. Cl.⁴ .............................................. B01D 23/28
[52] U.S. Cl. ................................ 210/474; 210/479; 99/295
[58] Field of Search ............... 210/469, 473, 474, 477, 210/478, 479, 480, 481; 99/279, 290, 292, 295, 298, 300, 304, 317, 323, 306; 220/403, 404

[56] References Cited

U.S. PATENT DOCUMENTS

| D. 217,381 | 4/1970 | Douglas | D44/26 |
|---|---|---|---|
| 232,817 | 10/1880 | Harrison | 210/474 |
| 1,168,544 | 1/1916 | Newlin | 210/474 |
| 2,684,624 | 6/1954 | Alvarez | 210/474 |
| 3,388,804 | 2/1966 | Hester | 210/477 |
| 4,176,588 | 12/1979 | Baron | 210/474 |
| 4,656,932 | 4/1987 | Kopp | 210/474 |

Primary Examiner—Richard V. Fisher
Assistant Examiner—Wanda L. Millard
Attorney, Agent, or Firm—Dowell & Dowell

[57] ABSTRACT

A continuous generally frusto-conically shaped ring for use in retaining the side walls of conventional automatic drip type coffee filters in erect orientation within filter support trays and which include an annular flange which is engageable with the top or sides of the filter in such a manner so as to not interfere with the normal passage of hot water through the coffee filter.

2 Claims, 1 Drawing Sheet

COFFEE FILTER RING

BACKGROUND OF THE INVENTION

1. Field of the Invention

This invention is generally directed to supports used in conjunction with paper or fiber coffee and similar beverage filters and more specifically the filter paper stabilizing rings which are selectively receivable within a coffee or similar filter in such a manner as to maintain the sides of the filter in their proper upright orientation without pinching or collapsing the side walls thereof. The filter rings also are constructed so as to not interfere with the lower portion of the filter wherein coffee grounds are placed and to not interfere with the slideable engagement between the filter tray and a coffee maker.

2. History of the Art

In conventional automatic drip type coffee makers, coffee grounds are maintained in an open bowl shaped paper or fiber filter which is selectively supported in a filter tray which tray is slideably retained by the automatic coffee maker. In use, hot water from the coffee maker passes into the coffee grounds carried within the filter paper and passes through an opening provided in the lower central portion of the filter support tray. One major problem that exists with the use of automatic drip coffee makers is that, frequently, the filter paper will become bent or collapsed as the filter support tray is slidingly urged into proper position in the coffee maker. Coffee makers are made with little clearance between the upper edges of the filter support tray and the water heating chambers. This being the case, as the trays are placed in position, the filter paper which often extends slightly above the upper edges of the support tray will engage a portion of the coffee maker housing and be bent over thereby blocking the flow of water directly into the coffee grounds which are placed within the filter. When this condition occurs, the hot water will be partially drained along the edges of the filter paper and bypass the coffee grounds.

In an effort to cause paper filters to retain their pre-designated shaped within the trays of drip type coffee makers, manufacturers have recommended that consumers utilize filter papers having corrugated or pleated side walls. The corrugations are provided in order that the filter paper retain its natural shape in varying sizes of support trays as well as to provide a spring-like function to urge the filter out into its normally open configuration in the event it is slightly deformed when the filter support tray is being placed within the coffee maker. Unfortunately, such corrugated filters are also subject to being collapsed as the coffee filter tray is placed within the coffee maker resulting in an unsatisfactory brewing cycle as the flow of water is directed in a path which substantially bypasses the coffee grounds carried in the filter.

In older non-automatic type drip coffee makers, filters were frequently maintained within the coffee pot or brewing container by means of interlocking support rings which would engage the upper portion of the filter and lock it in fixed relation with respect to the coffee pot. Such devices were utilized to suspend a filter within the pot and are not compatible with the conventional type support trays which are utilized with today's automatic drip coffee makers. One of the benefits of the conventional drip type coffee makers utilized today is their operating convenience. The ability to use a disposable coffee retaining filter in a support tray allows coffee grounds to be easily placed within the coffee maker and quickly and cleanly disposed of once a brewing cycle is completed with only slight rinsing of the tray being required after a brewing cycle. In the older types of filter locking or engaging rings, the multi-component filter retainers not only required additional handling by the consumer but the multi-component parts thereof required that the parts be disassembled in order to dispose of used coffee grounds and filters. Therefore, such multiple filter retaining mechanisms are not appropriate for use in today's automatic drip type coffee maker equipment. In addition, prior art filter interlocking support rings for suspending coffee filters with respect to a coffee pot have been designed without consideration of the need to insure that any coffee filter supporting apparatus does not interfere with the proper engagement of a filter support tray and a coffee maker housing and does not adversely affect the shape of the filter element. Many prior art filter supports included vertically extending side wall portions which were elevated with respect to the upper edges of the filter and therefore could not be utilized in conventional drip type coffee makers used today.

Other, more recent, prior art devices which have been designed to retain the upper edges of coffee filters in proper position within a support tray have utilized fixed locking devices carried by the support tray. Such devices may include pivotable arms or clamps which swing from the upper edge of the tray into overlapping engagement with the upper edge of the filter in order to maintain the filter against the side of the tray. Such devices not only add to the manufacturing costs of the trays but are also not totally adequate in that they do not continuously engage the entire circumference of a filter.

Some examples of prior art coffee filter retainers include U.S. Design Pat. No. 217,381 to Douglas, U.S. Pat. Nos. 232,817 to Harrison; 1,168,544 to Newlin; 3,388,804 to Hester and 4,176,588 to Baron.

SUMMARY OF THE INVENTION

This invention is directed to a coffee filter ring for maintaining the side walls of a conventional automatic drip type coffee filter in a proper upright orientation within a coffee filter tray wherein the coffee filter ring includes generally frustro-conically inclined side wall portions which taper inwardly from the upper to the lower portions thereof. The ring includes an outwardly extending annular flange which extends from the upper portion of the conical side walls in a plane which is substantially perpendicular to the upper wall of the coffee filter tray. The ring is of a size and weight to be selectively seated or supported on or within the upper portion of a coffee filter so as to be spaced from the lower portions thereof wherein coffee grounds are normally retained. The annular flange of the filter ring will either be supported on the upper edges of the coffee filter paper or engage the inner portions of the filter paper adjacent the upper edges thereof depending upon the size of the coffee filter tray.

It is a primary object of the present invention to provide an inexpensive and lightweight device for insuring that the side walls of conventional drip type coffee filters are maintained in a proper upright position when being utilized in an automatic drip coffee maker without the device having to interfit with any other components of the coffee maker or without the device interfering with any of the components of the coffee maker.

It is another object of the present invention to provide a coffee filter ring which may be utilized to retain the side walls of conventional drip type coffee maker filters in their proper orientation wherein the coffee filter ring is designed to be engaged with the inner side walls of the coffee filter ring adjacent the upper edges thereof so as to be spaced from the lower coffee retaining area of the coffee filter so that no interference is created between the filter ring and the coffee being brewed.

It is also an object of the invention to provide a coffee filter ring which may be utilized with different sizes and types of automatic drip type coffee makers so that one size of ring may be utilized in a plurality of applications wherein an outer flange is provided extending outwardly from the conical body of the ring which flange may be engagable with either the top or side wall portions of a filter element so as to maintain the filter ring in a spaced orientation from the bottom of the filter.

It is another object of the present invention to provide an inexpensive device for insuring that the side walls of conventional coffee filter elements are retained in a proper orientation within a coffee filter support tray and which is designed to be of a size and weight so as not to collapse the side walls of the filter element or otherwise interfere with the proper functioning of the filter element.

In accordance with another embodiment of the present invention, a coffee filter ring is provided in combination with a conventional coffee filter wherein the filter ring includes an annular outwardly extending flange which is selectively seated on or slightly within the filter to thereby retain the filter in a proper configuration while also assuring the filter is properly seated within a filter support tray.

DESCRIPTION OF THE PREFERRED EMBODIMENT

Figure 2:
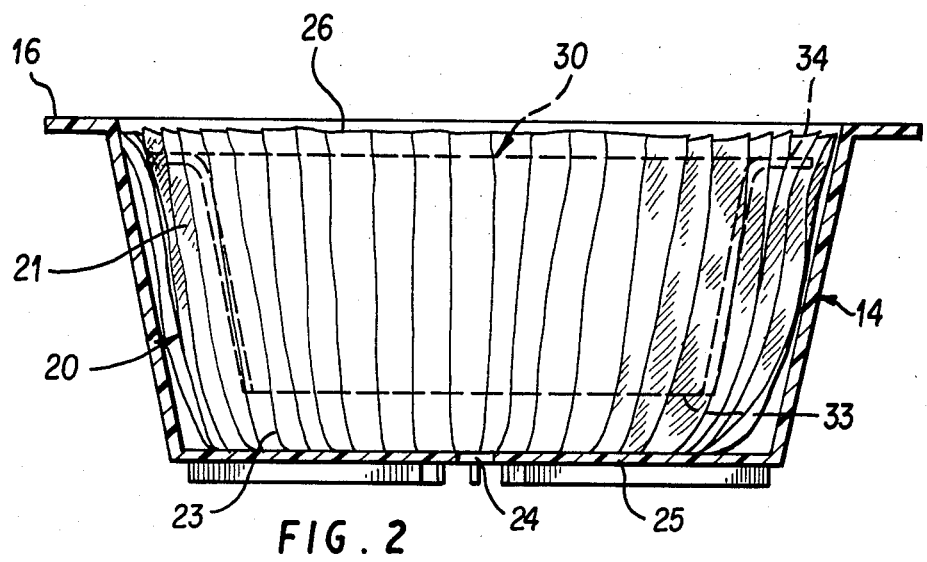
FIG. 2 is a cross sectional illustrational view showing a different size of coffee filter support tray having a pleated filter therein wherein the coffee filter ring of the present invention is situated within the filter adjacent the upper edges thereof.

With continued reference to the drawings, conventional drip type coffee makers 10 generally include a water heating section or compartment 11 which is mounted along the upper portion of the coffee maker and a coffee pot heating element 12 on which a coffee pot 13 is situated. A coffee filter support tray 14 is generally slideably carried in opposing tracks 15 which are mounted in closely spaced relationship below the water heating compartment 11. In this manner, there is only a small clearance space S available between the upper flange 16 of the coffee filter support tray and the bottom wall of the water heating compartment.

In order to brew coffee, a paper or other fabric filter element 20 is placed within the interior of the filter support tray so that the side portions 21 of the filter generally extend along the inner side walls 22 of the filter support tray. The filter may be pleated as indicated in the drawings in order to further reinforce the coffee filter and also allow the filter to be expanded or contracted to fit various sizes of coffee filter support trays. Coffee C is placed in the bottom portion 23 of the filter so that as water is introduced into the opening in the upper portion of the filter, the hot water will pass through the coffee and the bottom of the filter element through an opening 24 in the bottom 25 of the filter support tray and thereafter into a coffee pot such as shown at 13.

In use of such filter elements, it frequently happens that the upper edges 26 of the filter paper may be bent or collapsed into overlying relationship with the coffee C in such a manner that the water being introduced from the water heating compartment 11 into the filter element is directed by the side walls 21 of the filter element and thereby bypasses the coffee before passing through the opening 24. In order to retain the side walls 21 of the coffee filter in proper orientation with regard to the side walls 22 of the coffee support tray, the coffee filter ring 30 is shown as being cooperatively supported within the filter element.

The coffee filter ring 30 includes a frustro-conically shaped side wall or body portion 31 which tapers inwardly from the uppermost portion 32 to the lower circular edge portion 33. The conical body portion 31 is retained in a fixed relationship with the side walls 21 of the filter 20 by an annular flange 34 which is integrally formed and extends outwardly from the upper side wall portions 32 of the ring. The annular flange 34 is shown as being oriented generally parallel to the upper flange 16 of the filter support tray.

Figure 1:
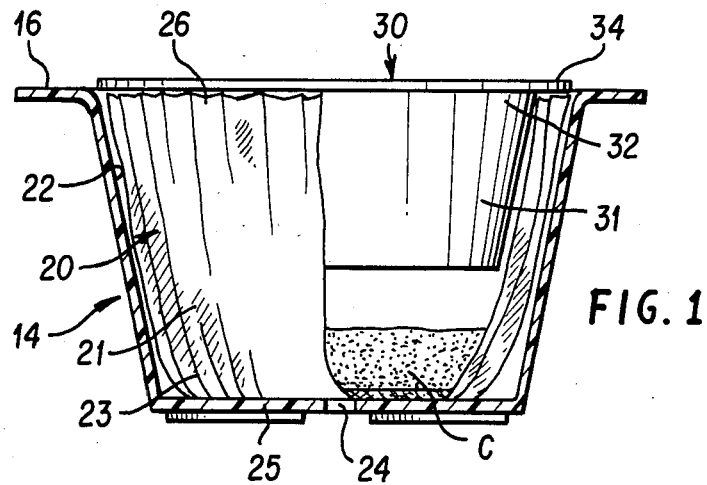
FIG. 1 is a cross sectional view through a conventional coffee filter support tray showing portions of the coffee filter broken away and showing the filter retaining ring of the present invention in side view as seated on the upper edge of the coffee filter.
Figure 3:
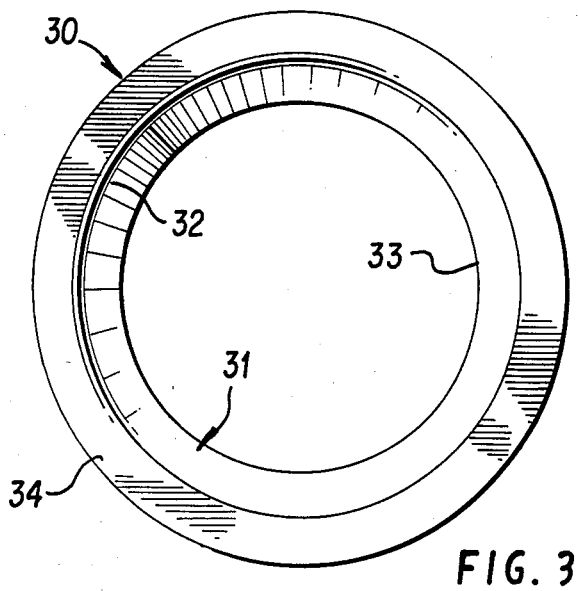
FIG. 3 is a top plan view of the coffee filter ring of the present invention.
Figure 4:
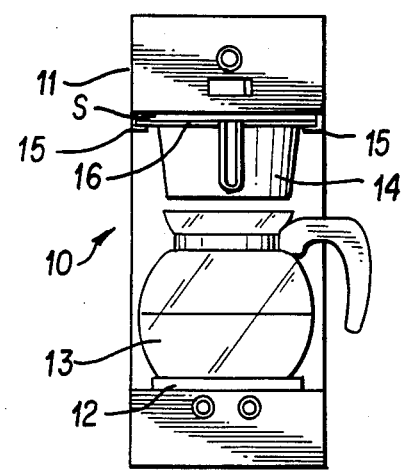
FIG. 4 is a front plan view illustrating the clearance between a coffee filter support tray of a conventional drip coffee maker and the water heating tank.

As previously discussed, the filter support ring 30 of the present invention is designed to be used with various sizes of filters or filter support trays and yet provide a structure which will retain the side walls of the filter in their proper orientation without the filter ring engaging or interfering with the bottom of the filter or the coffee contained therein. To this extent, FIG. 1 reflects the filter ring being utilized in a filter tray which coincides with the general diameter of the filter ring while FIG. 2 reflects a situation wherein the coffee filter tray is of a larger size and wherein the filter ring actually is seated against the side walls of the filter element without being supported by any portion of the tray. It is important that the outwardly extending annular flange be of a sufficient diameter to insure that the bottom edge 33 of the filter ring does not interfere with or engage the bottom of the filter element. If the ring were to engage the filter element, any water passing inwardly of the ring would be confined by the side walls thereof so that the water could not effectively pass through the walls of the filter adjacent thereto. In either of the above embodiments, it is noted that the weight of the ring will not only insure that the side walls of the filter are retained in their proper orientation without collapsing their pleated configuration but will also function to cause the filter paper to settle into a properly seated position within a coffee filter support tray. This is especially true when the annular flanges are supported on the upper edges 26 of the filter elements.

The coffee filter ring 30 is integrally molded from a lightweight plastic material such as a polypropylene so that the weight thereof is minimized. In some situations, however, it could be that the ring may be formed of a lightweight metallic material or even a paper-like material which could be disposable. Regardless of the material, the height of the filter element should be less than the height of a conventional filter element so that the bottom edge 33 of the ring will be spaced from the bottom of any filter element with which the ring is utilized. By way of an example, a prototype ring has been designed having a side wall depth of 1½ inches with the diameter of the lower portion of the ring being slightly less than 3 inches while the outer diameter including the flange element is approximately 4 inches. A wall thickness of between 3/32 and 1/16 inch would appear to be sufficient to provide rigidity for any plastic material which may be utilized to form the ring.

In use, it is envisioned that a coffee filter ring 30 would be made available with a package of coffee filters so that the consumer would have the ring available whenever filters were being purchased. When it is desired to prepare coffee, after the filter element is placed within a conventional filter support tray, the filter ring is simply placed either on or within the filter element depending upon the relative diameter of the element with respect to the coffee filter ring. In those embodiments where the flanges of the filter ring engage the upper portion of the filter paper, the weight of the ring will have a tendency to force the paper to the bottom of the tray thereby preventing the edges of the paper from extending above the tray where they would otherwise may interfere or be altered by placement of the tray within a coffee maker. In those embodiments where the ring simply sits within the filter element, the annular flange will insure that the bottom of the filter ring will be spaced from the bottom of the filter element as the annular flange engages the side walls of the filter adjacent the upper edge thereof. Once the coffee has been brewed, the filter ring is simply lifted from its engagement with the filter and thereafter the filter discarded in the conventional manner. The filter ring may thereafter be stored for future use directly within the filter support tray of the coffee maker.

I claim:

1. A combination coffee filter and filter support for maintaining the sides of the filter in alignment with the side walls of a automatic drip coffee filter tray which is movably carried by an automatic drip coffee maker, comprising, a coffee filter element having a bottom wall and upwardly extending side walls, said side walls being of a first height, a generally circular and continuous ring element having generally frustro-conical side walls which taper inwardly from the upper to the lower portions thereof, said side walls of the ring element being of a second height which is less than said first height, an outwardly oriented and generally planar annular flange extending from said upper portion of said side walls of the ring element, said flange of said ring element having a diameter of a size to insure that said flange will engage the side walls of said filter element at a position which will insure that the lower portion of said circular ring element is maintained in spaced relationship from said bottom of said filter element.

2. A combination coffee filter and coffee filter support comprising a coffee filter element having a bottom portion and upwardly extending annular side wall portions, the side wall portions of the filter element having an upper edge, a coffee filter support ring element, said ring element having continuous and generally frustro-conical side walls which taper inwardly from the upper to the lower portion thereof and an annular and generally planar flange extending outwardly from the upper portion of said side walls of the ring element, said flange of said ring element being of a size to be selectively seated on the upper edge of said filter element with said side walls of said ring element extending inwardly of said filter element, said side walls of said filter element being of a first height and said side walls of said ring element being of a second height which is less than said first height so that the lower portion of said ring element is retained in spaced relationship from said bottom of said filter element.

* * * * *